Figure 1:
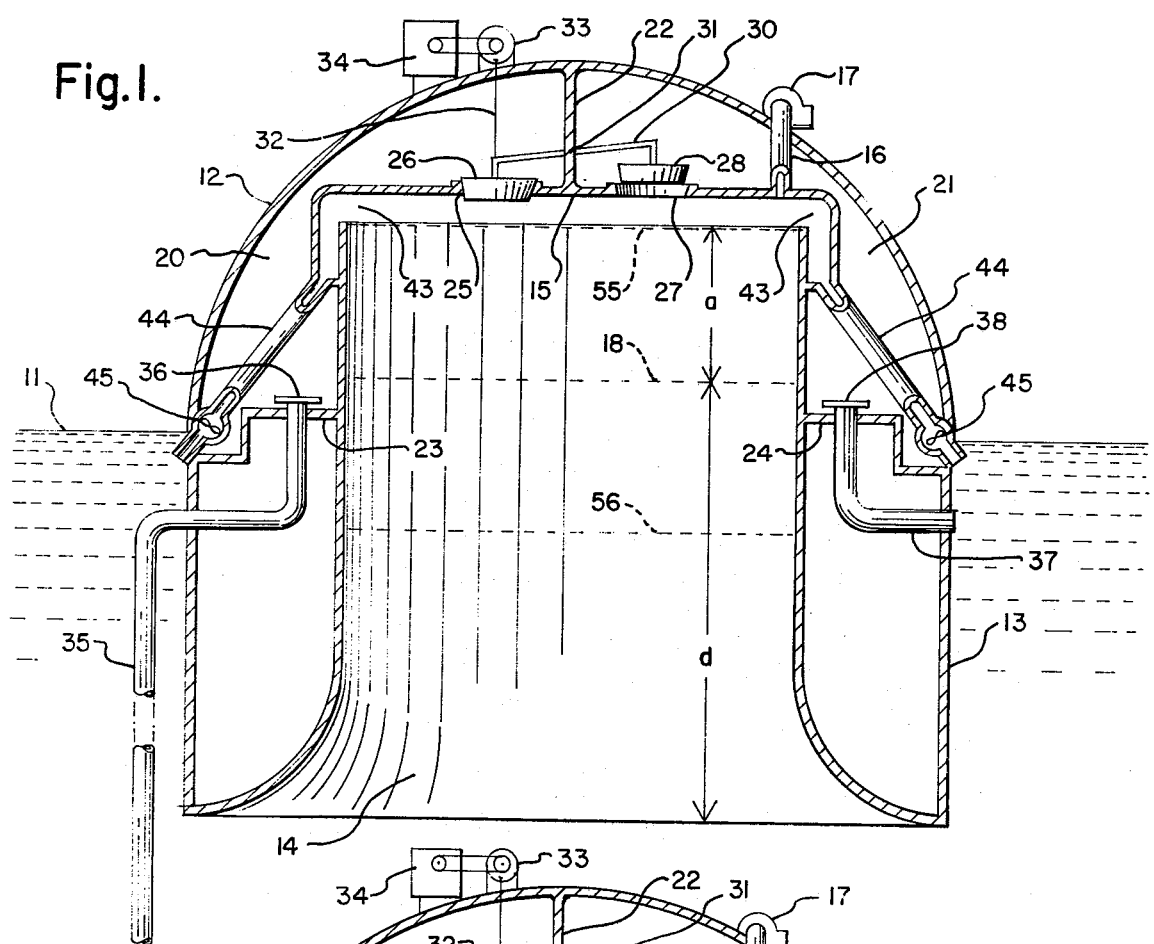

United States Patent [19]

Fetkovich

[11] 4,083,189

[45] Apr. 11, 1978

[54] OPEN CYCLE METHOD AND APPARATUS FOR GENERATING ENERGY FROM OCEAN THERMAL GRADIENTS

[75] Inventor: John G. Fetkovich, O'Hara Township, County of Allegheny, Pa.

[73] Assignee: Carnegie-Mellon University, Pittsburgh, Pa.

[21] Appl. No.: 778,791

[22] Filed: Mar. 17, 1977

[51] Int. Cl.² .............................................. F03G 7/04
[52] U.S. Cl. ......................................... 60/641; 60/398
[58] Field of Search .................................. 60/641, 398

[56] References Cited

U.S. PATENT DOCUMENTS

| | | | |
|---|---|---|---|
| 3,916,626 | 11/1975 | Schur | 60/641 X |
| 3,967,449 | 7/1976 | Beck | 60/641 |
| 3,995,160 | 11/1976 | Zener et al. | 60/641 X |

Primary Examiner—Allen M. Ostrager
Assistant Examiner—Stephen F. Husar
Attorney, Agent, or Firm—Buell, Blenko & Ziesenheim

[57] ABSTRACT

Power is generated by subjecting a body of water in an evacuated chamber alternately to pressure corresponding to the vapor pressure of water at the surface of a body of water, such as tropical sea water, and pressure corresponding to the vapor pressure of subsurface water. The body of water falls and rises in correspondence with the changing pressures and the pressures are alternated in synchronism with the natural period of oscillation of the body of water so as to increase the amplitude of its oscillation. Power is withdrawn from the oscillating body of water either by feeding overflow water to water turbines or by anemometer type turbines within the chamber. Apparatus details are disclosed.

13 Claims, 8 Drawing Figures

U.S. Patent    April 11, 1978    Sheet 2 of 2    4,083,189

OPEN CYCLE METHOD AND APPARATUS FOR GENERATING ENERGY FROM OCEAN THERMAL GRADIENTS

This invention relates to apparatus and method for generating energy from thermal gradients in a body of water. It is more particularly concerned with open cycle apparatus and method in which the working fluid is the water itself.

Several methods of generating energy from thermal gradients in bodies of water, such as sea water, have been proposed, both open and closed cycle. The first-mentioned has the considerable advantage of requiring no heat exchanger apparatus, but it has the disadvantage that the temperature difference between surface water, even warm sea water, and subsurface water is small. Thus, the vapor pressure difference is small and numbers of large low-pressure vapor turbines are required to obtain significant amounts of power. Claude U.S. Pat. No. 2,006,985 of July 2, 1935 discloses such a system. Recently E. J. Beck has suggested a second form of open cycle power plant utilizing tropical ocean temperature differentials (Science, Volume 189, page 293, 1975). His scheme is to use water vapor in place of air in an air lift pump to lift liquid water to a height above the static pressure head. The power is extracted by a hydraulic turbine fed by this water, rather than by a turbine operating on a low vapor pressure differential. A process superior to Beck's process in several respects is disclosed in U.S. Pat. No. 3,995,160, issued to Clarence Zener and John Fetkovich on Nov. 30, 1976. In the patented method Beck's mixed liquid-vapor phase is modified to a foam structure. The physical properties of the foam permit a maximum utilization of the enthalpy potential. A plant designed to achieve the lowest possible capital cost per unit power output, however requires the foam to be lifted a distance on the order of 600 feet.

It is an object of my invention to be described hereinafter to provide apparatus and method for open cycle generation of power from thermal gradients in bodies of water which is more efficient than those presently known. It is another object to provide such apparatus which is more compact per unit of power than those previously known. Other objects of my invention will appear in the description thereof which follows.

In the method of my invention I subject a body of water in a closed top, partially immersed evacuated chamber to alternating pressures corresponding to the vapor pressure of subsurface water and to the vapor pressure of surface water, thereby causing the level of water in the chamber to rise and fall, and synchronize the application of those pressures with the natural period of oscillation of water in the chamber so as to maintain sustained oscillations of considerable amplitude. Energy is withdrawn either as potential or kinetic energy, or both, from the oscillating body of water. I also provide apparatus suitable for my process.

Embodiments of my invention presently preferred by me are illustrated in the attached figures, to which reference is now made.

Figure 2:
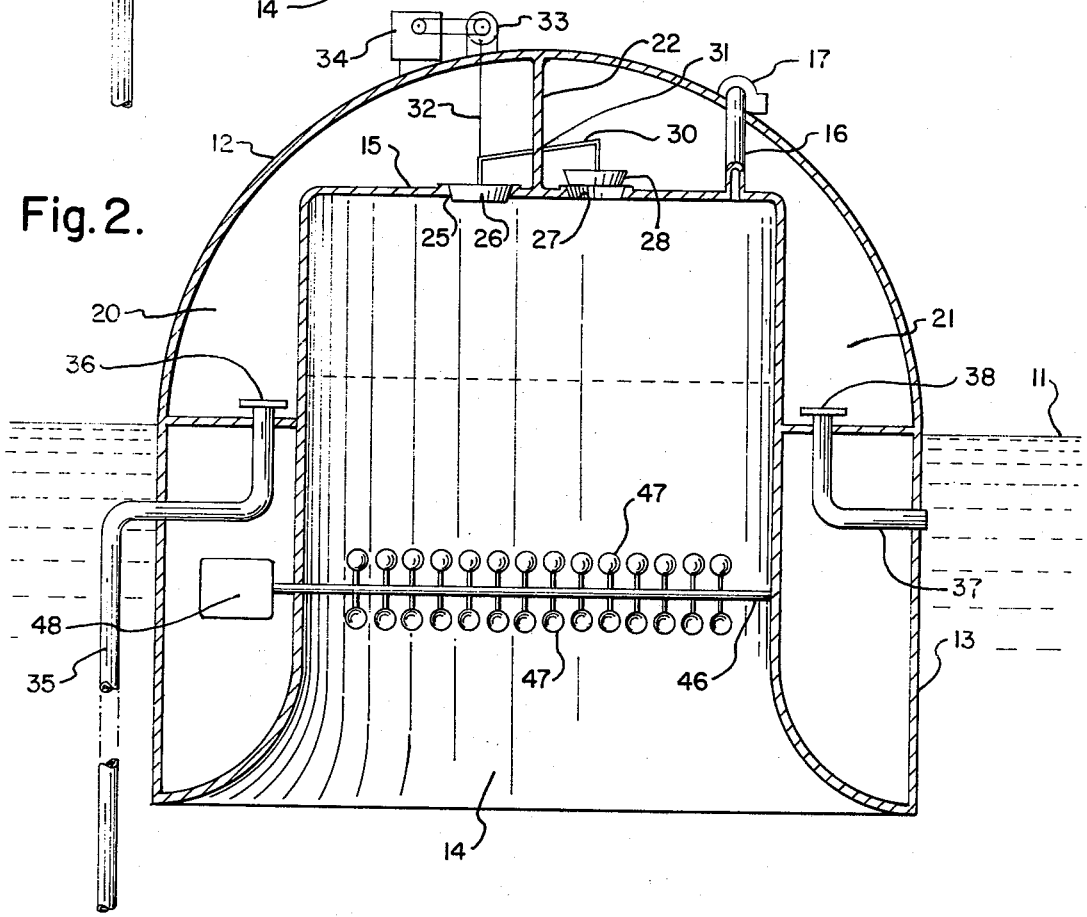
Figure 3:
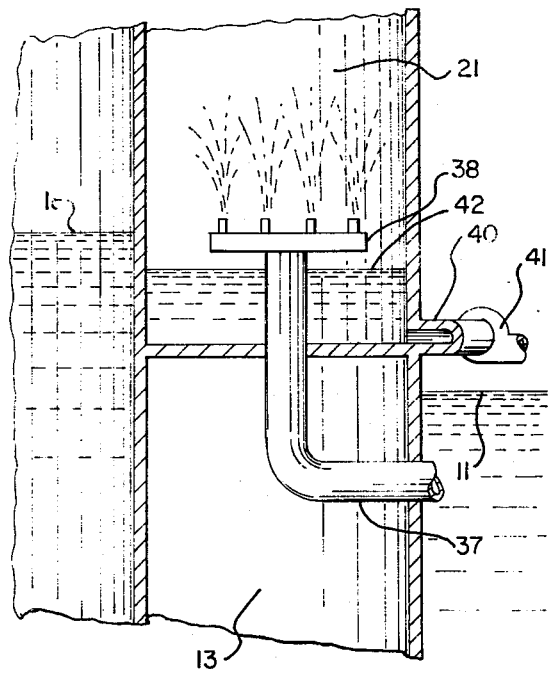
Figure 6:
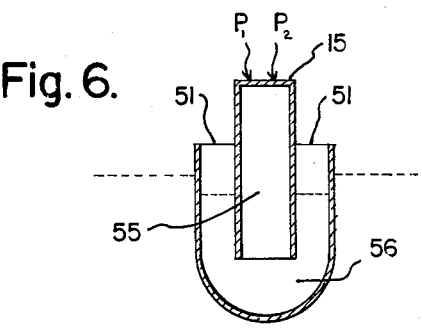
Figure 7:
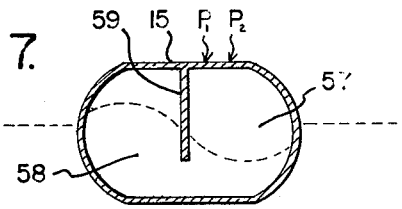
Figure 8:
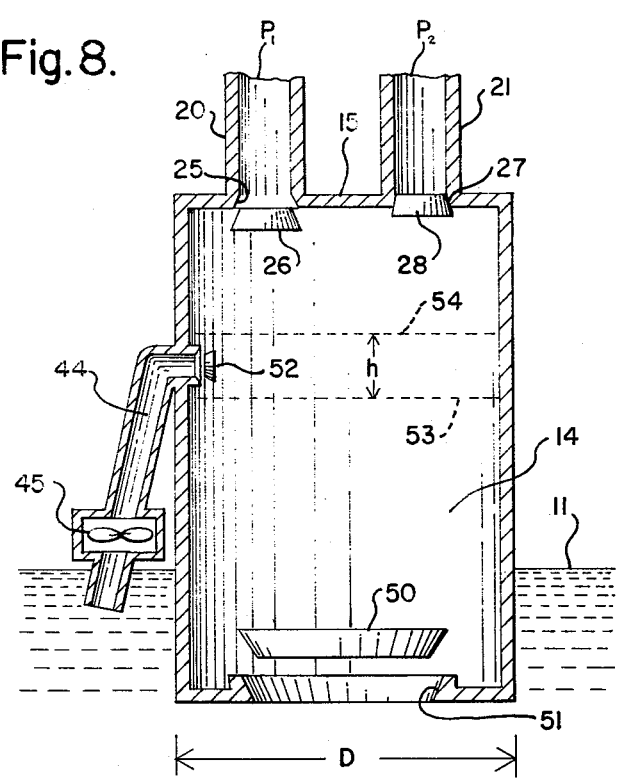

FIG. 1 is a diagrammatic representation in vertical section of a first embodiment of apparatus of my invention, FIG. 2 is a like representation of a modification of the apparatus of FIG. 1, FIG. 3 is a like representation of a detail of the apparatus of FIGS. 1 and 2, FIGS. 4, 5, 6 and 7 are diagrammatic representations of other embodiments of the chamber portion of the apparatus of my invention, FIG. 8 is a diagrammatic sketch illustrating the basic principles of my invention.

FIG. 1 illustrates apparatus, which floats partially immersed in a body of water such as tropical sea water, the level of which is indicated at 11. The apparatus comprises a hemispherical dome portion 12 which continues downwardly as a cylindrical skirt portion 13. The buoyancy of the apparatus is adjusted so that it floats with its waterline at approximately the junction of dome portion 12 and skirt portion 13. Most of the interior of the apparatus is taken up by an upstanding cylindrical chamber or cavity 14 which is open at the bottom and extends into dome portion 12, but has a top 15 which is closed, except as is otherwise disclosed hereinafter. A duct 16 in top 15 connected to a suction pump or blower 17 which is preferably outside dome 12 evacuates the interior of chamber 14 above water so that the undisturbed water level therein is above that of the outside water, as is shown by dotted line 18.

The remainder of dome portion 12 outside of chamber 14 is divided into two compartments 20 and 21 by vertical partition 22 intersecting the apex of dome portion 12. Chamber 20 is closed off at the bottom by a semi-annular horizontal partition 23, which also closes off chamber 12 as a semi-annular partition 24, both sections of the partition being located at approximately the junction of dome portion 12 and skirt portion 13 of my apparatus. Compartment 20 communicates with chamber 14 through a port 25 in top 15, which may be closed by a valve element 26. Compartment 21 also communicates with chamber 14 through a port 27 in top 15, which may be closed by a valve element 28. Valve elements 26 and 28 are carried at opposite ends of beam 30 which is pivoted at its center 31 in partition 22. Beam 30 is connected by an arm 32 with a crank device 33 positioned outside dome portion 12. Crank 33 is rotated by a motor 34 so as to raise and lower valve elements 26 and 28, alternately opening and closing each port 25 and 27 out of phase. It will be evident that suction pump 17 above mentioned also evacuates compartments 20 and 21 through ports 25 and 27.

A conduit 35, the lower end of which extends to subsurface water substantially colder than the surface water, enters compartment 20 through its floor 23 and terminates therein in spray head 36. A conduit 37, the lower end of which communicates with water at surface temperature enters compartment 21 through floor 24 and terminates therein in spray head 38. FIG. 3 is an enlarged view of the portion of compartment 21 above described. Because of the periodic operating of valve 28 the pressure in compartment 21 will be slightly lower than the vapor pressure of the warm sea water entering through duct 37. At a level near that of floor 24 an outlet 40 is connected to a suction pump 41 which discharges into the water outside. Pump 41 tends to pump out water discharged by spray 38 so that the level of water in chamber 21 indicated at 42 is maintained lower than that in chamber 14. Because of the sub-atmospheric pressure in compartment 21, sea water will be drawn in through duct 37 and sprayed through spray head 38, generating water vapor. The corresponding portion of compartment 20 is likewise provided with a suction pump similarly arranged, except that water intake conduit 35 has its lower end considerably below the surface of the body of water.

Between the wall of chamber 14 and its top 15 an annular gap 43 or series of spaced gaps permit overflow of water through conduits 44, provided at their sea level ends with water turbines 45, to produce power in a manner to be explained hereinafter. Alternative means are illustrated in FIG. 2, which is the same in all respects except those to be described as FIG. 1. The apparatus of FIG. 2 has no gap between the wall of chamber 14 and top 15. It is provided with a horizontal shaft 46 journaled at each end in the inner wall of skirt portion 13 and carrying a plurality of cups spaced along it and around it and facing the same way, as in an anemometer. One end of shaft 46 is connected to an electrical generator 48.

In the operation of my apparatus, cold subsurface water is drawn into compartment 20 through conduit 35 and spray head 36, forming water vapor having a pressure corresponding to the temperature of subsurface water. Warm surface water is drawn into compartment 21 through conduit 37 and spray head 38, forming water vapor having a pressure corresponding to surface water temperature. An elementary way of utilizing the difference between those vapor pressures to generate energy is illustrated in FIG. 8, and it will simplify explanation of my inventive method and apparatus to consider first the elementary scheme of FIG. 8.

Most of the apparatus shown in that figure is the same as that of my apparatus previously described herein and carries the same reference characters. The significant differences between FIGS. 8 and 1 are that in FIG. 8 the bottom of chamber 14 is a large port 51 which can be closed off by check valve 50. An overflow duct 44 is provided with a valve element 52. When valve 28 is opened and valve 26 is closed, chamber 14 is connected to warm vapor compartment 21, but as it is evacuated, the water level indicated at 53 is above that of the body of water 11, as before. Overflow duct 44 is positioned to open just above water level 53. In operation, valve 52 is closed. Valve 26 is then opened and valve 28 is closed. Chamber 14 is now in communication with cold vapor chamber 20 and the water in chamber 14 will rise to a new level 54. Check valve 50 will permit water to enter while the water is rising, but it will close as the head above it increases, preventing water from flowing out. If valve 52 is now opened, the water between levels 53 and 54 will flow out through conduit 44, operating turbine 45. The cycle may be endlessly repeated, thus drawing energy from the temperature gradient in the body of water.

Unfortunately, the economics for this system are very poor. The energy $e$ extracted per cycle is given by the equation:

$$e = \pi/4 \, (P_2 - P_1) D^2 h$$

where $P_2$ and $P_1$ are warm and cold vapor pressures respectively, D is the diameter of cylindrical chamber 14 and $h$ is the difference in water levels in that chamber. The power output W then is given by the equation:

$$W = \frac{e}{t} = \frac{\pi}{4} (P_2 - P_1) \frac{D^2 h}{t}$$

where $t$ is the cycle period. In a typical example $P_2$ would be 322.1 kg/m², corresponding to a warm water temperature of 25° C, $P_1$ would be 88.9 kg/m², corresponding to a cold water temperature of 5° C, $h$ would be 23 cm, and $t$ about 10 seconds. If W is required to be 100 megawatts D works out to be nearly 1½ miles. In order to decrease D, while retaining the same power output, $h$ must be increased.

I bring about this increase by causing the column of water in chamber 14 to oscillate, and I maximize the amplitude of the oscillation by causing the oscillation to occur at the natural frequency of oscillation of chamber 14, its resonance frequency. This can best be made clear by returning to FIG. 1.

The quiescent or equilibrium water level in chamber 14 is at 18 as has been mentioned. This is about 30 feet above sea level 11. If now valve 28 is opened and valve 26 is closed, the vapor in compartment 21 at its relatively high pressure will flow into chamber 14 and depress the water level therein. When valve 28 is closed and valve 26 is opened, water vapor at a somewhat lower pressure enters chamber 14 and the water level therein rises. The valve opening and closing cycle is adjusted to correspond to the natural period of oscillation of the water in chamber 14 and the energy so added to the oscillating water increases its amplitude of oscillation. Dotted line 55 represents the maximum height of the water in chamber 14 and dotted line 56 represents its minimum height. When the water reaches level 55 some of it will overflow through gap 43 into conduits 44 and operate turbines 45. The energy so generated is withdrawn from the oscillating body of water as static energy. Means for withdrawing energy as dynamic energy are shown in FIG. 2. The oscillating column of water will rotate shaft 46 always in the same direction because the anemometer type cups 47 will be moved only in one direction, regardless of the direction of flow of the water.

In FIG. 1, the height of the water in chamber 14 above the bottom of skirt 13 is indicated as $d$. The amplitude of oscillation is indicated as $a$, and the diameter of the column of water in chamber 14, is D, as previously indicated in FIG. 8. The oscillation will be approximately simple harmonic if $d$ is considerably greater than $a$. The period of oscillation $t$ will be $t = 2\pi\sqrt{d/g}$ where $g$ is the acceleration of gravity. At any amplitude $a$, the energy in the oscillation is $$E = \pi/8 \, gpD^2a^2,$$

where $p$ is the density of seawater, and D is the diameter of the column. The energy added in each cycle is $$e = \pi/2 \, (P_2 - P_1) D^2 a.$$

When the desired amplitude, $a$, is reached, useful work may be extracted from the oscillations. If the energy extracted each cycle is equal to that added, the amplitude will remain constant in time. In this condition, the power output will be $$W = \frac{e}{t} = \frac{1}{4} \sqrt{\frac{g}{d}} \, (P_2 - P_1) D^2 a.$$

It is instructive to consider numerical values. As above, I assume $T_1 = 5°$ C and $T_2 = 25°$ C corresponding to $P_1 = 88.9$ kg/m² (0.1265 lb/in²) and $P_2 = 322.1$ kg/m² (0.4581 lb/in²). I take D = 100 m $a$=50m and $d$=100m. I then find W=90 Mw and $t$=20 sec. The fraction of the total oscillation energy extracted each cycle is $$\frac{e}{E} = \frac{4(P_2 - P_1)}{gpa} = .0186.$$

To summarize, I have invented a system to extract energy from the ocean thermal gradients. It is an "open cycle" system which allows me to do away with the massive and expensive heat exchangers. At the same time I have eliminated the need for a large volume, low pressure vapor turbine by using the vapor pressure difference, $P_2 - P_1$, to raise water to great height. The pressure difference $P_2 - P_1$ corresponds to height change of only 23 cm. A central element of my invention is to use synchronous application of pressures to increase this height change many fold.

Figure 4:
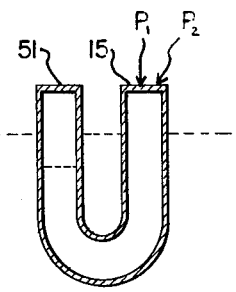
Figure 5:
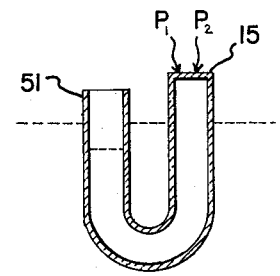

It is not necessary that chamber 14 be an upright column. FIGS. 4, 5, 6 and 7 show other forms which chamber 14 may take. The chamber could be U-shaped with both ends 15 and 51 closed as shown in FIG. 4, or with one open end 51, as shown in FIG. 5. The chamber could be a three-dimensional or developed U tube as shown in FIG. 6, having a central leg 55 and a surrounding leg 56 with annular end 51, which may be open, as shown, or closed as in FIG. 4. The chamber may take the form of a closed vessel of any shape as shown in FIG. 7, divided by a central partition 59 which extends from its top 15, but stops short of its bottom to divide the vessel into connected chambers 57 and 58. The body of water in such a vessel would oscillate from side to side in the "slosh" or "bathtub" mode.

In any of the forms of the chamber above described, it may be desirable to float a layer of thermally insulating fluid, such as an oil, on the water surface in order to inhibit the condensation of vapor inside the chamber when the warm valve is open and to inhibit evaporation of water from inside the chamber when the cold valve is open.

It may also be desirable to float a rigid structure on the surface of the oscillating water column in order to suppress higher frequency oscillation modes in that column. Such a float could be coupled to a generator.

In the foregoing specification I have set out certain preferred embodiments of my invention, however, it will be understood that this invention may be otherwise embodied within the scope of the following claims.

We claim:

1. Apparatus for generating energy from the thermal gradient in a body of water comprising a closed-top evacuated chamber partially immersed in the water and extending above the water level therein, first valved means connecting the closed portion of the chamber with a source of water vapor at a pressure corresponding to the surface temperature of the body of water, second valved means connecting the closed portion of the chamber with a source of water vapor at a pressure corresponding to the subsurface temperature of the body of water, means for repeatedly opening and closing the first valve and simultaneously closing and opening, respectively, the second valve, in synchronism with the natural frequency of oscillation of the water in the chamber so as to cause oscillation of the water in the chamber, and means for extracting energy from the oscillating water in the chamber.

2. The apparatus of claim 1 in which the means for extracting energy comprise overflow collecting means positioned around the closed-top chamber so as to collect overflow of water at the upper extreme of its oscillation, and turbine means driven by that overflow.

3. The apparatus of claim 1 in which the means for extracting energy comprise anemometer-like means positioned inside the closed chamber so as to be rotated by the oscillating column of water.

4. The apparatus of claim 1 in which the closed top chamber is a columnar chamber open at the bottom.

5. Apparatus of claim 1 in which the closed top chamber is U-shaped.

6. Apparatus of claim 1 in which the closed top chamber comprises a central closed-top open-bottom portion positioned in and surrounded by a closed-bottom portion.

7. Apparatus of claim 1 in which the closed-top chamber is divided by a vertical partition stopping short of its closed bottom.

8. Apparatus of claim 1 in which the source of water vapor at a pressure corresponding to the surface temperature of a body of water comprises a closed compartment, means connecting that compartment with surface water, means for pumping that compartment to reduce the water level therein below the level corresponding to the surface water temperature, and spray nozzle means positioned in the closed compartment and connected with the surface water, whereby surface water is sucked into the closed compartment by the partial vacuum within that compartment and is vaporized therein by the spray nozzles.

9. Apparatus of claim 1 in which the source of water vapor at a pressure corresponding to the subsurface temperature of the body of water comprises a closed compartment, means connecting that compartment with subsurface water, means for pumping that compartment to reduce the water level therein below the level corresponding to the subsurface water temperature, and spray nozzle means positioned in the closed compartment and connected with the subsurface water whereby subsurface water is sucked into the closed compartment by the partial vacuum within that compartment and vaporized therein by the spray nozzles.

10. The method of generating energy from thermal gradients in a body of water comprising maintaining a subatmospheric pressure over a confined volume of water, lowering that pressure to a value approximating the vapor pressure of subsurface water, whereby the level of the confined volume of water tends to rise, raising the pressure over the confined volume of water to a value approximating the vapor pressure of surface water, whereby the level of the confined body of water tends to fall, repeatedly lowering and raising the pressure so as to cause the confined volume of water to oscillate, thereby increasing the distance between its upper and lower levels, and withdrawing energy from that oscillating body of water.

11. The method of claim 10 in which the pressure over the confined volume of water is raised and lowered in synchronism with the natural frequency of oscillation of the confined body of water, so as to produce sustained oscillation of the body of water.

12. The method of claim 10 in which the energy is withdrawn as potential energy by tapping off a fraction of the body of water while it is at its upper level of oscillation.

13. The method of claim 10 in which the energy is withdrawn as kinetic energy by causing the oscillating body of water to drive rotating means positioned therein.

* * * * *

UNITED STATES PATENT OFFICE
CERTIFICATE OF CORRECTION

Patent No. 4,083,189  Dated April 11, 1978

Inventor(s) John G. Fetkovich

It is certified that error appears in the above-identified patent and that said Letters Patent are hereby corrected as shown below:

Column 3, line 53, the equation " $e = \pi/4 \ (P_2-P_1)D^2h$ " should read -- $e = \frac{\pi}{4} (P_2-P_1)D^2h$ --;

Column 4, line 45, the equation " $E = \pi/8 \ gpD^2a^2$ " should read -- $E = \frac{\pi}{8} gpD^2a^2$ --;

Column 4, line 50, the equation " $e = \pi/2 \ (P_2-P_1)D^2a$ " should read -- $e = \frac{\pi}{2} (P_2-P_1)D^2a$ --;

Column 4, line 65, "0.4581" should be -- .4581 --; and

Column 5, line 1, in the equation, "$P_2$" (second occurrence) should be -- $P_1$ --.

Signed and Sealed this

Twenty-second Day of August 1978

[SEAL]

Attest:

RUTH C. MASON
*Attesting Officer*

DONALD W. BANNER
*Commissioner of Patents and Trademarks*